(12) United States Patent
Derrick

(10) Patent No.: US 7,178,482 B1
(45) Date of Patent: Feb. 20, 2007

(54) PET ENCLOSING SYSTEM

(76) Inventor: Patti A. Derrick, 4525 Rustic Ridge Ct., The Colony, TX (US) 75056

( * ) Notice: Subject to any disclaimer, the term of this patent is extended or adjusted under 35 U.S.C. 154(b) by 0 days.

(21) Appl. No.: 11/140,047

(22) Filed: May 31, 2005

(51) Int. Cl.
*A01K 1/035* (2006.01)

(52) U.S. Cl. .............. 119/484; 119/499; 119/474; 119/514

(58) Field of Classification Search ........ 119/472, 119/474, 491, 492, 482, 484, 498, 499, 502, 119/504, 512, 513, 514, 519
See application file for complete search history.

(56) References Cited

U.S. PATENT DOCUMENTS

| 1,973,952 | A | * | 9/1934 | Goldberg | ............... | 119/474 |
| 4,291,645 | A |   | 9/1981 | Cruchelow et al. | | |
| 4,788,934 | A |   | 12/1988 | Fetter | | |
| 4,989,546 | A |   | 2/1991 | Cannaday | | |
| 5,261,350 | A |   | 11/1993 | Vavrek | | |
| 5,649,500 | A |   | 7/1997 | Klavemann et al. | | |
| 6,029,609 | A |   | 2/2000 | Bahar et al. | | |
| 6,394,035 | B1 |  | 5/2002 | Hill | | |
| 6,467,433 | B1 | * | 10/2002 | Stanton et al. | ............... | 119/512 |
| 6,912,974 | B2 | * | 7/2005 | Ozeri et al. | ............... | 119/484 |

\* cited by examiner

*Primary Examiner*—T. Nguyen

(57) ABSTRACT

A pet enclosing system includes a door that is positioned in a wall. The door has a pet door positioned therein. Each of a plurality of panels has a first lateral edge and a second lateral edge. The plurality of panels includes a first panel, a second panel and a third panel. A plurality of hinges hingedly couples together the panels. A first coupler and a second coupler are provided and mounted on either side of the door. The second coupler is mounted on the wall and is positioned to a second lateral side of the door. The first coupler is configured to couple the second lateral edge of first panel to the wall and the second coupler is configured to couple the second lateral edge of the third panel to the wall so that the panels form a barrier around a space adjacent to the door.

5 Claims, 3 Drawing Sheets

PET ENCLOSING SYSTEM

BACKGROUND OF THE INVENTION

1. Field of the Invention

The present invention relates to pet enclosing devices and more particularly pertains to a new pet enclosing device for forming a barrier around a pet door.

2. Description of the Prior Art

The use of pet enclosing devices is known in the prior art. U.S. Pat. No. 4,989,546 describes a housing that is positioned adjacent to a door having a pet door therein. The housing retains a pet in a position adjacent to the door so that it cannot move about a dwelling. Another type of pet enclosing device is U.S. Pat. No. 4,788,934. Still yet another such device is found in U.S. Pat. No. 4,291,645.

While these devices fulfill their respective, particular objectives and requirements, the need remains for a device that includes a collapsible barrier assembly which may be easily moved away from a door when not in use.

SUMMARY OF THE INVENTION

The present invention meets the needs presented above by generally comprising a door that is positioned in a wall. The door has a pet door positioned therein. The pet door is positioned adjacent to a bottom edge of the door. Each of a plurality of panels has a first lateral edge, a second lateral edge, a top edge and a bottom edge. The plurality of panels includes a first panel, a second panel and a third panel. A plurality of hinges hingedly couples together the panels so that the first later edge of the first panel is hingedly coupled to the second lateral edge of the second panel and the first lateral edge of the second panel is hingedly coupled to the first lateral edge of the third panel. A first coupler and a second coupler are provided. The first coupler is mounted on the wall and is positioned to a first lateral side of the door. The second coupler is mounted on the wall and is positioned to a second lateral side of the door. The first coupler is configured to couple the second lateral edge of first panel to the wall and the second coupler is configured to couple the second lateral edge of the third panel to the wall so that the panels form a barrier around a space adjacent to the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
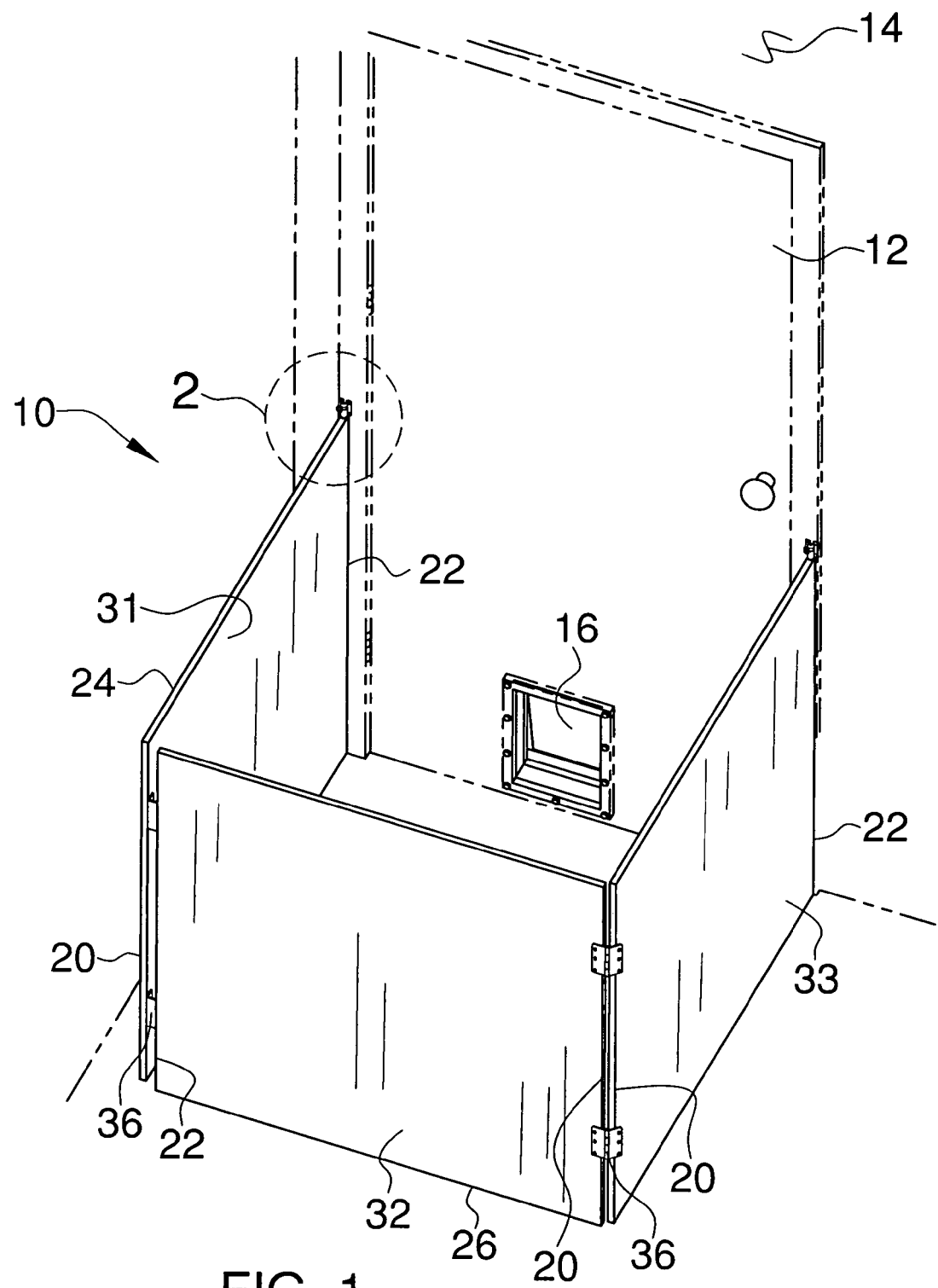
FIG. 1 is a perspective view of a pet enclosing system according to the present invention.
Figure 2:
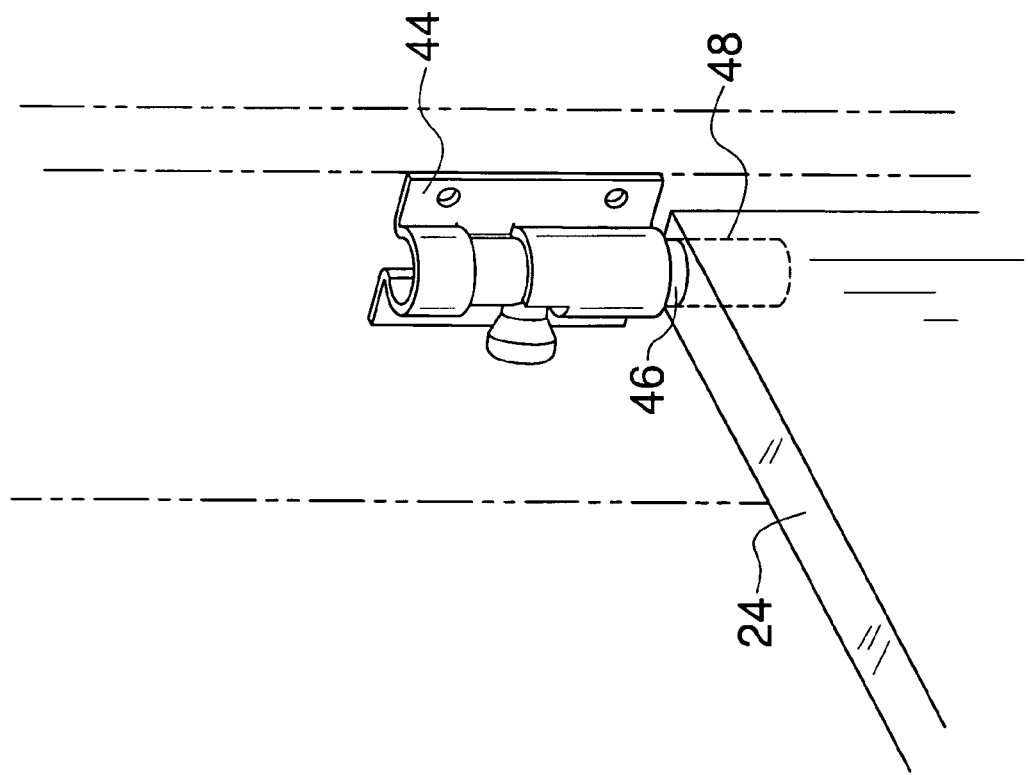
FIG. 2 is an enlarged view of area "2" of FIG. 1 of the present invention.
Figure 3:
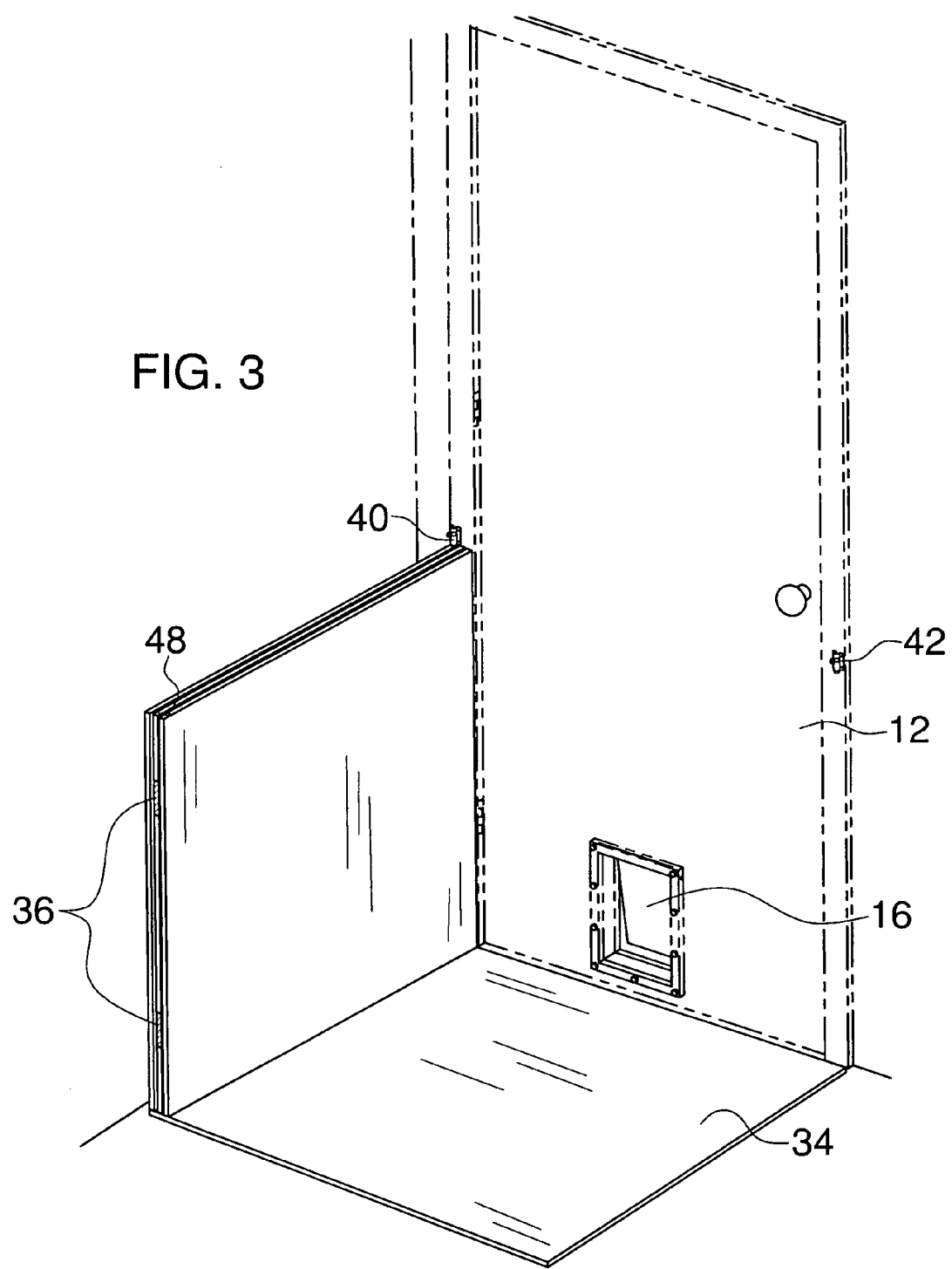
FIG. 3 is a perspective view of the present invention.

With reference now to the drawings, and in particular to FIGS. 1 through 3 thereof, a new pet enclosing device embodying the principles and concepts of the present invention and generally designated by the reference numeral 10 will be described.

As best illustrated in FIGS. 1 through 3, the pet enclosing system 10 generally comprises a door 12 is positioned in a wall 14. The door 12 has a pet door 16 positioned therein. The pet door 16 is positioned adjacent to a bottom edge of the door 12.

A plurality of panels is provided. Each of the panels has a first lateral edge 20, a second lateral edge 22, a top edge 24 and a bottom edge 26. Each of the panels has a height from the bottom edge 26 to the top edge 24 generally between 2 feet and 4 feet and a width from the first lateral edge 20 to the second lateral edge 22 generally between 2 feet and 4 feet. The plurality of panels includes a first panel 31, a second panel 32 and a third panel 33.

A plurality of hinges 36 hingedly couple together the panels so that the first later edge 20 of the first panel 31 is hingedly coupled to the second lateral edge 22 of the second panel 32, and the first lateral edge 20 of the second panel 32 is hingedly coupled to the first lateral edge 20 of the third panel 33.

A first coupler 40 and a second coupler 42 are provided. The first coupler 40 is mounted on the wall 14 and is positioned to a first lateral side of the door 12. The second coupler 42 is mounted on the wall 14 and is positioned to a second lateral side of the door 14. The first coupler 40 is configured to couple the second lateral edge 22 of first panel 31 to the wall 14 and the second coupler 42 is configured to couple the second lateral edge 22 of the third panel 33 to the wall 14 so that the panels 31–33 form a barrier around a space adjacent to the door 14. Each of the first 31, second 32 and third 33 panels is vertically orientated when the first 31 and third 33 panels are coupled to the wall 14.

Each of the couplers 40, 42 includes a bracket 44 and a pin 46 selectively extendable downward from a respective one of the brackets 44. Each of the top edges 24 of the first 31 and third 33 panels has a well 48 extending therein. Each of the wells 48 is positioned adjacent to a respective one of the second lateral edges 22. The pins 46 are each removably positionable in one of the wells 48.

In use, the panels 31, 33 are mounted on the wall 14 as indicated above so that a barrier is formed around the pet access opening 16. The barrier allows an animal to enter a dwelling, but prevents its access to an entirety of the dwelling. A bottom panel 34 may be provided as well and the first 31, second 32 and third 33 panels are positioned on the bottom panel 34. The bottom panel 34 protects floor adjacent to the door 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet enclosing system for a pet access comprising:

a door being positioned in a wall, said door having a pet door positioned therein, said pet door being positioned adjacent to a bottom edge of the door;

a plurality of panels, each of said panels having a first lateral edge, a second lateral edge, a top edge and a bottom edge, said plurality of panels including a first panel, a second panel and a third panel;

a plurality of hinges hingedly coupling together said panels such that said first later edge of said first panel is hingedly coupled to said second lateral edge of said second panel and said first lateral edge of said second panel being hingedly coupled to said first lateral edge of said third panel, said panels being laterally collapsible or extendable with respect to each other; and a first coupler and a second coupler, said first coupler being mounted on said wall and being positioned to a first lateral side of said door, said second coupler being mounted on said wall and being positioned to a second lateral side of said door, said first coupler being configured to couple said second lateral edge of first panel to said wall and said second coupler being configured to couple said second lateral edge of said third panel to said wall such that said panels form a barrier around a space adjacent to said door.

2. The system according to claim 1, wherein each of said panels has a height from said bottom edge to said top edge generally between 2 feet and 4 feet.

3. The system according to claim 2, wherein each of said panels has a width from said first lateral edge to said second lateral edge generally between 2 feet and 4 feet.

4. The system according to claim 1, wherein each of said couplers includes a bracket and a pin selectively extendable downward from a respective one of said brackets, each of said top edges of said first and third panels having a well extending therein, each of said wells being positioned adjacent to a respective one of said second lateral edges, each of said pins being removably positionable in one of said wells.

5. A pet enclosing system for a pet access comprising:

a door being positioned in a wall, said door having a pet door positioned therein, said pet door being positioned adjacent to a bottom edge of the door;

a plurality of panels, each of said panels having a first lateral edge, a second lateral edge, a top edge and a bottom edge, each of said panels having a height from said bottom edge to said top edge generally between 2 feet and 4 feet, each of said panels having a width from said first lateral edge to said second lateral edge generally between 2 feet and 4 feet said plurality of panels including a first panel, a second panel and a third panel;

a plurality of hinges hingedly coupling together said panels such that said first later edge of said first panel is hingedly coupled to said second lateral edge of said second panel and said first lateral edge of said second panel being hingedly coupled to said first lateral edge of said third panel, said panels being laterally collapsible or extendable with respect to each other; and a first coupler and a second coupler, said first coupler being mounted on said wall and being positioned to a first lateral side of said door, said second coupler being mounted on said wall and being positioned to a second lateral side of said door, said first coupler being configured to couple said second lateral edge of first panel to said wall and said second coupler being configured to couple said second lateral edge of said third panel to said wall such that said panels form a barrier around a space adjacent to said door, each of said first, second and third panels being vertically orientated when said first and third panels are coupled to said wall, each of said couplers including a bracket and a pin selectively extendable downward from a respective one of said brackets, each of said top edges of said first and third panels having a well extending therein, each of said wells being positioned adjacent to a respective one of said second lateral edges, each of said pins being removably positionable in one of said wells.

* * * * *